E. H. SCHOFIELD, DEC'D.
R. H. SCHOFIELD, ADMINISTRATOR.
COTTON PICKING NOZZLE OR TUBE.
APPLICATION FILED JULY 10, 1912.
1,120,980.
Patented Dec. 15, 1914.
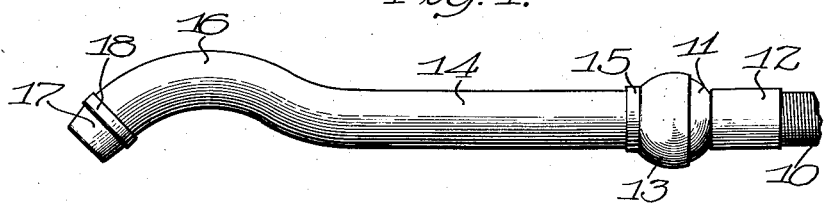
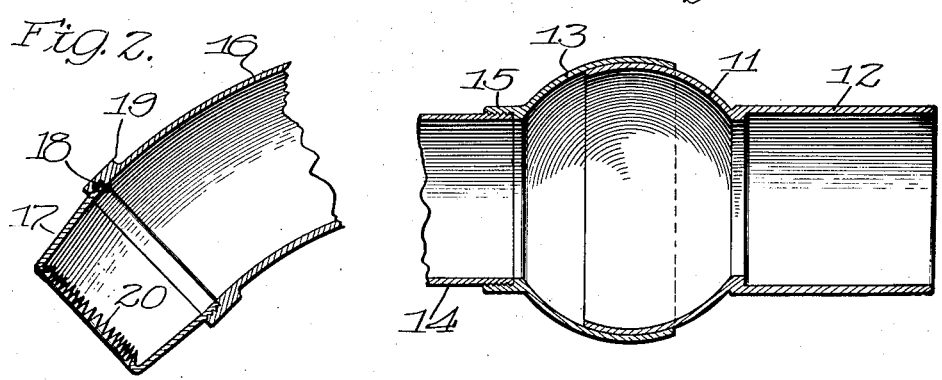
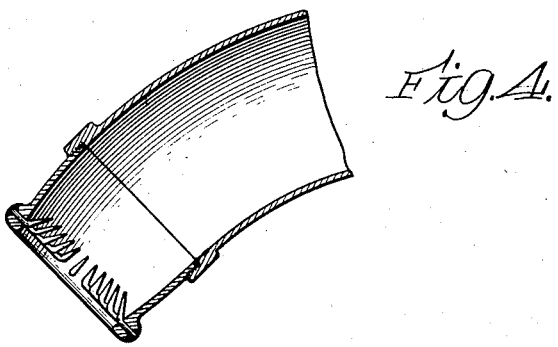
Witnesses:
Inventor:
Eugene H. Schofield
By Brown & Hopkins
Attys.

UNITED STATES PATENT OFFICE.

EUGENE H. SCHOFIELD, OF ATLANTA, GEORGIA; RAY H. SCHOFIELD ADMINISTRATOR OF SAID EUGENE H. SCHOFIELD, DECEASED.

COTTON-PICKING NOZZLE OR TUBE.

1,120,980.  Specification of Letters Patent.  Patented Dec. 15, 1914.

Application filed July 10, 1912. Serial No. 708,552.

*To all whom it may concern:*

Be it known that I, EUGENE H. SCHOFIELD, a citizen of the United States, residing at Atlanta, in the county of Fulton and State of Georgia, have invented certain new and useful Improvements in Cotton-Picking Nozzles or Tubes, of which the following is a specification.

This invention relates to that class of cotton picking machines depending for their picking action upon the influence of external atmospheric pressure when a partial vacuum is created within the tube or passage held contiguous to the cotton boll to be picked, causing the boll to follow along in such passage or tube into a collecting chamber or receptacle; and the invention has for one of its objects to provide an improved and efficient picking tube of this class having perfect freedom of movement and, by the aid of such partial vacuum, of picking or detaching the cotton boll and carrying the same away from the plant without danger of becoming clogged by bolls of unusual size.

A further object is to provide an improved form of picking nozzle.

To the attainment of these ends and the accomplishment of other new and useful objects, as will appear, the invention consists in the features of novelty in substantially the construction, combination and arrangement of the several parts hereinafter more fully described and claimed and shown in the accompanying drawings illustrating the invention and in which—

Figure 1 is an elevation of an improved picking tube or nozzle constructed in accordance with the principles of this invention. Fig. 2 is a sectional view of a portion of the picking tube and nozzle. Fig. 3 is a detail sectional view of the joint between the nozzle and the conduit. Fig. 4 is an enlarged detail elevation in section of a modified form of the nozzle.

In the present exemplification of the invention, the numeral 10 designates a portion of a suitable flexible conduit which is constructed of any suitable material preferably steel hose, to the end of which is secured the ball section 11 of a ball and socket joint and which section 11 is connected to a tube or socket 12 by means of which the section 11 may be secured to the conduit 10. The other section 13 of the ball and socket joint receives the section 11 and the body of the socket 13 and is spun over the section 11 to hold the parts together. The joint thus formed is constructed of any suitable material, preferably brass or bronze and before the socket is spun over the ball, the latter is ground so as to make a free moving joint and when the sections are thus connected, the air pressure on the outside of the socket will keep it air tight.

The nozzle proper, designated generally by the reference numeral 14, is connected at one end in any suitable manner, preferably by a threaded connection with a socket 15 carried by the member 13, and the nozzle comprises a rigid or comparatively rigid tubular portion constructed of any suitable light material. The portion of the nozzle 14 adjacent its free extremity, is preferably bent or curved, as at 16, so that when the tubular portion is held in the hand of the operator at the point near the joint or ball and socket members 11, 13, the free extremity will extend downwardly or outwardly like a finger in a form best adapted for insertion into the plant so as to bring the mouth piece or nozzle tip 17 squarely into contact with the boll which it is desired to pick. By the provision of the flexible conduit 10, the operator is enabled to operate or handle the nozzle to readily direct its end to the cotton boll and cause the same to be detached and conveyed away from the plant to any desired point.

In order to prevent the inlet ends of the nozzles from becoming clogged by the cotton bolls and in order to rapidly pick or remove the cotton, the inlet or mouth of the nozzle 16 formed by the nozzle tip 17, is contracted at its inlet end or made considerably smaller than the diameter of the remaining portion of the nozzle. This increases and concentrates the picking force and secures a maximum velocity and efficiency with a minimum of vacuum and power by avoiding undue friction of the cotton with the nozzles and the conduit. This will prevent clogging and also increase the velocity of the air in the inlet to the nozzle so that when the contracted inlet is brought in contact with the loose cotton, the latter will be instantly compressed within the inlet, forming a temporary closure which instantly increases the degree of vacuum within the nozzle and the air pressure instantly forces the cotton into the picking nozzle and onto the conduit 10 to be conveyed to any desired point. The action of the air is instantaneous, so that all the operator has to do is to touch the different bolls in rapid succession thereby causing the cotton to be picked more rapidly and in a better condition than when pulled by the fingers of the operator.

The nozzle tip 17 is preferably separate from the nozzle 16 and is adapted to be secured in position or connected to the nozzle 16 in any desired or suitable manner, preferably by means of a screw threaded portion 18 engaging a threaded socket 19 on the end of the nozzle. This tip, as has been before stated, is contracted toward the picking extremity at which point it is provided with a plurality of inwardly projecting inclined teeth 20, which incline in a direction toward the center of the nozzle tip and terminate short of each other, thereby constituting an inwardly projecting toothed lip at the free extremity of the nozzle which surrounds the nozzle and forms an unobstructed passage between the teeth and into the nozzle. By the provision of these teeth any cotton which for any reason will cling to the boll so that it will not be removed by suction alone may be readily removed owing to the fact that when the cotton is drawn into the nozzle by the suction and past the teeth 20, it cannot be withdrawn through the nozzle and all that is necessary after a portion of the cotton on the boll has passed these teeth, is to move the nozzle with respect to the boll and the teeth will operate in a manner to forcibly remove or pick the cotton from the boll and deliver it to the suction within the conduit. This movement of the nozzle with respect to the boll may be either a bodily movement or a rotary side twist, which movement is possible owing to the ball and socket connection 11 and 13.

The nozzle tip 17 may be formed of any suitable material and in any suitable manner but is preferably formed of material which is harder than the nozzle proper 16 and the tip 17 is preferably of tool steel and formed in a lathe and the teeth cut afterward by hand with a file or in any suitable manner.

By the provision of the detachable tip, it will be manifest that the nozzle tips may be removed when worn or different sized tips may be provided for different kinds of cotton as the size of the bolls vary more than half in different varieties of cotton.

Fig. 4 of the drawing illustrates a modified form of nozzle tip in which the teeth are provided in a different manner from that before described. In this form of the invention the outer tip of the nozzle has holes drilled through it and into these holes are driven short prepared pins and after they are driven through this tip they are bent backwardly and toward the inner surface of the nozzle at quite an obtuse angle so that by reason of their shortness and their comparative flatness with relation to the entrance they leave a large area for the inlet and present very little obstruction to the incoming cotton, while at the same time having just enough of inclination to prevent the cotton from being withdrawn as the tube is removed from the plant after the picking has been accomplished. Preferably the outer ends of the teeth or pins are set in a groove and the groove filled with solder after the pins are driven through the tip so as to make a smooth exterior surface and hold the pins in place.

Of course, modifications would readily occur in the details of the devices hereinbefore described to any person skilled in the art which would not depart from the principle of the invention, and I therefore do not wish to be understood as limiting myself to the exact details shown and described so long as the spirit and substance of the device and its operation remain undisturbed.

What is claimed as new is:

1. A picking nozzle embodying a rigid tubular body straight for a portion of its length and formed with a fixed crook at one end, the crooked end having a contracted inlet mouth and the end being bent inwardly and having notches along the edge to form teeth.

2. In combination a tubular picking nozzle, and a removable toothed tip therefor having a contracted inlet.

3. In a device of the class described, the combination of a tubular nozzle member, and a removable tip therefor having a contracted round inwardly toothed inlet opening.

4. In a device of the class described, the combination of a tubular nozzle member, a removable tip therefor having a contracted inlet opening, and inwardly projecting teeth adjacent the open end.

5. The combination of a tubular inflexible member having a crook adjacent one end forming a handhold, and a detachable tip contracted at the outer end and having inwardly projecting teeth inclined away from the outer end.

6. A picking nozzle embodying a tubular inflexible body having a contracted inlet and teeth projecting into the nozzle away from the inlet, a flexible non-collapsible conduit and an air-tight universal connection between the tubular body and the conduit.

7. In a device of the class described, the combination with a tubular inflexible body having a crook adjacent one end and a contracted inlet with inwardly projecting teeth at the same end, of a flexible non-collapsible conduit, and a tubular universal connection between the body and conduit, the body being of such a length that the crook thereof forms a hand-hold with the universal connection disposed at the elbow of the operator.

8. In a device of the class described, the combination with a tubular inflexible body having a straight portion and a crook adjacent one end, of a detachable tip for the crooked end having a contracted inlet and circumferentially arranged teeth projecting inwardly and away from the inlet, a flexible non-collapsible conduit, and a tubular universal joint connecting the conduit and the body at the straight end, the universal joint being disposed at the elbow of the operator and the said crook forming a hand-hold.

9. The combination with a cotton picking nozzle consisting of a rigid tubular member having a separate portion with a crook at one end and a restricted mouth opening at its end smaller than the cross-sectional area of the member with inwardly projecting teeth at the restricted mouth, of a flexible non-collapsible tube, and an air-tight universal joint connecting the nozzle and the tube, the tubular member being of a length so that the universal joint may be disposed at the elbow of an operator with the crook of the member forming a hand-hold by means of which the tubular member may be freely rotated.

10. The combination with a cotton picking nozzle consisting of a rigid tubular member having a separate portion with a crook at one end, of a tip releasably connected with the tube at the crooked end having a contracted inlet mouth with teeth projecting inwardly therefrom, a flexible non-collapsible tube, and an air-tight universal joint connecting the nozzle and the tube, the tubular member being of such a length that the universal joint may be disposed at the elbow of an operator with the crook of the member forming a hand-hold by means of which the tubular member may be freely rotated for engaging the teeth of the removable tip with the material picked.

In testimony whereof I have signed my name to this specification, in the presence of two subscribing witnesses, on this 25th day of April, A. D. 1912.

EUGENE H. SCHOFIELD.

Witnesses:
RAY H. SCHOFIELD,
CHARLES H. SEEM.